(12) United States Patent
Plachetka

(10) Patent No.: US 12,140,232 B2
(45) Date of Patent: Nov. 12, 2024

(54) ROCKER VALVE COMPRISING A SEALING ELEMENT

(71) Applicant: Agilent Technologies, Inc., Santa Clara, CA (US)

(72) Inventor: Clemens Plachetka, Malsch (DE)

(73) Assignee: Agilent Technologies, Inc., Santa Clara, CA (US)

( * ) Notice: Subject to any disclaimer, the term of this patent is extended or adjusted under 35 U.S.C. 154(b) by 141 days.

(21) Appl. No.: 17/793,010

(22) PCT Filed: Jan. 28, 2021

(86) PCT No.: PCT/IB2021/050672
§ 371 (c)(1),
(2) Date: Jul. 14, 2022

(87) PCT Pub. No.: WO2021/152500
PCT Pub. Date: Aug. 5, 2021

(65) Prior Publication Data
US 2023/0046809 A1    Feb. 16, 2023

(30) Foreign Application Priority Data
Jan. 30, 2020  (DE) ................. 10 2020 102 297.2

(51) Int. Cl.
*F16K 31/52* (2006.01)
*F16K 11/02* (2006.01)
*F16K 11/052* (2006.01)

(52) U.S. Cl.
CPC .......... *F16K 11/022* (2013.01); *F16K 11/052* (2013.01); *F16K 31/52* (2013.01)

(58) Field of Classification Search
CPC ....... F16K 11/022; F16K 11/052; F16K 31/52
See application file for complete search history.

(56) References Cited

U.S. PATENT DOCUMENTS

| | | |
|---|---|---|
| 2,935,086 A | 5/1960 | Lehman et al. |
| 3,683,962 A | 8/1972 | Good |
| 4,285,497 A | 8/1981 | Goettel |
| 4,986,308 A | 1/1991 | Champseaux |
| 5,983,941 A | 11/1999 | Fritz et al. |
| 6,003,552 A | 12/1999 | Shank et al. |
| 6,484,754 B1 | 11/2002 | Muth et al. |
| 8,302,933 B2 | 11/2012 | Scheibe |
| 8,434,514 B2 | 5/2013 | Bezold et al. |
| 8,893,747 B2 | 11/2014 | Weib |
| 2016/0367990 A1 | 12/2016 | Futamata et al. |

FOREIGN PATENT DOCUMENTS

| | | |
|---|---|---|
| DE | 202009016447 U1 | 3/2010 |
| DE | 102018104842 A1 | 4/2018 |

OTHER PUBLICATIONS

PCT Notification of Transmittal of The International Search Report & Written Opinion dated Apr. 22, 2021 for Application No. PCT/IB2021/050672, 14 pages.

*Primary Examiner* — Paul J Gray

(57) ABSTRACT

A rocker valve for opening or closing a fluid connection includes a valve chamber into which at least one opening feeds, a pivotally mounted rocker switch, and a membrane surface located between the rocker switch and the opening. By pivoting the rocker switch, the opening can be fluidically opened or closed relative to the valve chamber. The rocker valve further includes a sealing element that is located between the membrane surface and the opening when the rocker switch closes the opening relative to the valve chamber.

19 Claims, 3 Drawing Sheets

ROCKER VALVE COMPRISING A SEALING ELEMENT

RELATED APPLICATIONS

This application is the national stage under 35 U.S.C. 371 of International Application No. PCT/IB2021/050672, filed Jan. 28, 2021; which claims priority to German Application No. DE 10 2020 102 297.2, filed Jan. 30, 2020; the entire contents of each of which are incorporated by reference herein.

TECHNICAL FIELD

The present invention relates to a rocker valve, in particular for HPLC applications.

BACKGROUND

In high performance liquid chromatography (HPLC), a liquid must be pumped at typically very tightly controlled flow rates (for example, in the range of nanoliters to milliliters per minute) and at a high pressure (typically 20-100 MPa, 200-1000 bar, and beyond, to currently about 200 MPa, 2000 bar), at which the compressibility of the liquid becomes noticeable. For liquid separation in an HPLC system, a mobile phase, which—in operation—contains a sample liquid with components to be separated, is driven through a stationary phase (such as a chromatographic column) in order to thereby separate different components of the sample. The composition of the mobile phase can thereby be constant (isocratic mode) or varied (for example in so-called gradient mode) over time.

For liquid chromatography and other sample separation applications, it is necessary to perform mixing of different fluids, for example, different solvents, wherein the mixed fluid composition should be formed from these fluids in a well-defined manner.

There is often a plurality of solvent reservoirs upstream of a fluid drive or fluid delivery device (in particular, a high-pressure chromatographic pump) from which reservoirs solvents (such as water and ethanol) are provided for a chromatographic separation (for example, a gradient). These fluids or solvents are typically accelerated under the influence of gravity or by suitable pumps as they move through fluid lines, through a proportioning device, to a mixing or combining point, all the way to the high pressure pump. In this manner, gravitational effects and also the inertia of the fluid, in particular the path between the solvent containers and the mixing point or inlet of the high pressure pump, will have an influence. The described gravitational effects as well as variations in the viscosity of the fluids and the mass inertia of the fluids can lead to inaccuracy in the solvent composition and consequently in the sample separation.

Valves, including of different types, are deployed in HPLC in different positions along the flow path. A typical application is here, for example, in the supply of a pump (to bring the mobile phase to high pressure) with the appropriate solvent or mix of solvents, as described, for example, in DE102018104842A1 of the same applicant. Such a supply unit (often also called a proportioning device or multi-channel gradient valve) typically has one or more valves which are connected on the input side to one or more solvents and on the output side to an input of the pump. The valves are often controlled by a suitable control unit to selectively supply the pump with one or more solvents.

When switching the proportioning device, errors in volume of the solvents/fluids to be mixed can occur, especially when using lifting valves, which is to say valves in which a fluid path is opened or closed by actuating a piston. Such lifting valves also frequently do not close in a volume-neutral manner, which is to say that upon switching, an additional fluid volume is moved by the piston movement, so that there is a pumping effect due to the piston displacement upon switching. The exact amount of fluid supplied from a fluid line at the mixing or combining point is therefore sometimes unclear or inaccurate, which can be further exacerbated by the effects of compressibility. Moreover, it has been found that fluids can be diverted between fluid lines in undesirable ways by valve activity. Such parasitic effects can lead to incorrect volumes of the fluids being mixed or to destruction of the sealing surface.

One type of valve that, due to its design, has a much lower pumping effect than lifting valves and thus enables more volume-neutral switching is the so-called rocker valve, as described, for example, in U.S. Pat. No. 8,434,514A. A rocker valve is a valve with two membrane surfaces coupled by a rocker switch. These valves, like flipper valves, are therefore pressure balanced and reliably hold pressures applied in the direction that is opposite to the flow-through direction. Most of the fluid volume is transferred within the valve upon switching. The internal volume thereby remains almost constant, whereby the pumping effect is minimized. The two valve seats and the connecting fluid channel are usually in one plane. This allows rocker valves to have an extremely small internal volume and almost no dead volume. The geometry of the fluid channels is usually designed in such a way that no gaps occur, and very good rinsing capability is ensured. When switching, a cross flow is created between the two valve seats, which can prevent deposits in the valve chamber.

SUMMARY

It is an object of the present invention to improve rocker valves, in particular for HPLC applications.

An embodiment of the present invention relates to a rocker valve for opening or closing a fluid connection. The rocker valve comprises a valve chamber into which at least one opening feeds, a pivotally mounted rocker switch as well as a membrane surface located between the rocker switch and the opening. By pivoting the rocker switch, the opening can be opened or closed to fluid flow to the valve chamber. The rocker valve further comprises a sealing element located between the membrane surface and the opening when the rocker switch closes the opening to the valve chamber. This allows a functional separation between the membrane (or alternatively the membrane surface) and the sealing element, such that, in particular, the sealing element can specifically be selected and adapted for the function of the fluidic sealing, whereas the membrane/membrane surface can, in particular, be specified with respect to its mechanical resilience to the rocker motion.

The material of the membrane or membrane surface can be selected in such a manner that it behaves substantially independently of temperature over a desired temperature range. Many known elastomers are however too soft or not resistant enough in a wide temperature range, especially at low temperatures, such as less than 4° C., for example, and/or they are not sufficiently chemically resistant to certain solvents. Due to the functional separation, the sealing element can be optimized for its sealing effect by means of suitable material selection, especially in such a temperature range, as well as with regard to, for example, chemical resistance. The sealing properties can thus be shifted predominantly to the sealing element, whereas, for example, dynamic properties (such as stiffness) can be optimized for the membrane material.

In one embodiment, the sealing element makes a fluid-tight seal between the membrane surface and the opening when the rocker switch closes the opening to the valve chamber. In this way, it can be ensured that the sealing functionality is substantially performed by the sealing element exclusively when only the sealing element abuts against and seals the opening.

In one embodiment, the elasticity and/or toughness of the membrane surface within a temperature range intended for the operation of the rocker valve is/are substantially independent of the temperature. Due to the separation of functionality between the membrane and the sealing element, the respective materials used can also be suitably selected and adapted for the respective functionality, for example, in particular with respect to the temperature profile. This allows, in particular, for the intended and applicable temperature range to be extended by suitable selection of materials, for example, in particular in the range of lower temperatures, such as between 0° C. and 10° C., which cannot be specified by many conventional rocker valves.

In one embodiment, the modulus of elasticity, preferably the complex modulus of elasticity, of the membrane surface within a temperature range intended for the operation of the rocker valve is substantially independent of temperature or changes only insignificantly within this temperature range. This allows a high mechanical load capacity of the membrane surface in the intended temperature range and, as a consequence thereof, typically, also an extended service life.

In one embodiment, within a temperature range intended for the operation of the rocker valve, the sealing element has a sealing property that is sufficient for the rocker valve application, such that the sealing element can be pressed against the opening by pivoting the rocker switch so as to create a fluid-tight seal. This allows the sealing element to be adapted and/or optimized, for example by suitable material selection, to the sealing functionality within the entire intended temperature range.

In one embodiment, the toughness and/or modulus of elasticity, preferably the complex modulus of elasticity, of the sealing element may exhibit a temperature dependence within a temperature range intended for operation of the rocker valve without necessarily compromising the functionality of the rocker valve within the intended temperature range.

In one embodiment, the opening (to be sealed) is at least one of a valve inlet and a valve outlet. In addition to the opening or openings to be sealed, the rocker valve may also include one or more additional openings that are not sealed by actuation of the rocker switch.

In one embodiment, the valve chamber connects the valve inlet and the valve outlet for flow of fluid when the rocker valve is in open state. This allows a through-flow through the rocker valve.

In one embodiment, the rocker valve has a first opening and a second opening. In this, the first opening represents an inlet to the valve chamber, whereas the second opening represents an outlet from the valve chamber. By actuating the rocker switch, at least one of the openings can be opened or closed. This allows the opening or closing of a fluid connection through the rocker valve, which is to say between inlet and outlet via the valve chamber.

In one embodiment, the rocker switch has a first position in which the first opening is open to the valve chamber and the second opening is closed to the valve chamber, as well as a second position in which the first opening is closed to the valve chamber and the second opening is open to the valve chamber.

In one embodiment, the rocker valve has a first opening, a second opening, and a third opening. The first opening represents an inlet to the valve chamber, the second opening represents an outlet from the valve chamber, and the third opening represents another inlet to the valve chamber. The second opening is open to the valve chamber. The rocker switch has a first position in which the first opening is open to the valve chamber and the third opening is closed to the valve chamber, and a second position in which the first opening is closed to the valve chamber and the third opening is open to the valve chamber. Thus, a flow between one of the inlets and the outlet can selectively be achieved or rather be switched between these two flows by actuating the rocker switch. By interchanging the inlet and outlet, a flow (from the inlet) can correspondingly also be selectively diverted to one of the two outlets or alternatively be switched between these two outlets.

In one embodiment, the rocker switch is rotatably or pivotally mounted within a certain angular range.

In one embodiment, the rocker switch can be pivoted manually and/or actuated by a motor, as is sufficiently known in the prior art.

In one embodiment, at least a portion of the valve chamber is laterally bounded by the membrane surface. The valve chamber may further be laterally bounded by other surfaces, such as, for example, a surface in which the at least one opening feeds. The spatial extension of the valve chamber is respectively accordingly changed by moving the membrane surface.

In one embodiment, the sealing element is configured such that by pivoting the rocker switch, the sealing element can be pressed onto the opening to form a fluid-tight seal, thereby closing a fluid connection via the opening.

In one embodiment, the sealing element is connected to the membrane surface and is moved along with the membrane surface by the rocker switch.

In one embodiment, the sealing element surrounds the opening and extends into the valve chamber.

In one embodiment, the sealing element is represented by a first sealing element and a second sealing element, wherein the first sealing element is connected to the membrane surface and is moved along with the membrane surface by the rocker switch, and the second sealing element surrounds the opening and extends into the valve chamber.

In one embodiment, the membrane surface and/or the sealing element consists of or has a chemically resistant material.

In one embodiment, the membrane surface consists of or has a material selected from the group consisting of: Teflon® material, PEEK (polyetheretherketone), PTFE (polytetrafluoroethylene, for example Moldflon® material), as well as mixtures or modifications of the aforementioned materials.

In one embodiment, the sealing element consists of or has a material selected from the group consisting of: an elastic material, a perfluoroelastomer, perfluorinated rubber, FKM, FFKM, ETP® fluoroelastomer (a polymer of ethylene, tetrafluoroethylene (TFE) and perfluoromethylvinylether (PMVE)), as well as mixtures or modifications of the aforementioned materials.

In one embodiment, the intended temperature range is between −10° C. and 80° C., in particular between 0° C. and 50° C., and more particularly between 4° C. and 40° C.

Another embodiment relates to a rocker valve for establishing a fluid connection, for example for opening or closing the flow connection. The rocker valve thereby comprises a valve inlet, a valve outlet, and a valve chamber into which the valve inlet and the valve outlet feed into. In an embodiment, the valve chamber fluidically connects the valve inlet and the valve outlet in an open state of the rocker valve. The rocker valve further comprises a pivotally mounted rocker switch as well as a membrane surface located between the rocker switch and the valve inlet as well as the valve outlet. By pivoting the rocker switch, a fluid connection between the valve inlet and/or the valve outlet and the valve chamber can be opened or closed. The rocker valve furthermore comprises an inlet sealing element, which may be located between the membrane surface and the valve inlet creating a fluid-tight seal when the rocker switch closes the valve inlet to the valve chamber, as well as an outlet sealing element, which may be located between the membrane surface and the valve outlet creating a fluid-tight seal when the rocker switch closes the valve outlet to the valve chamber.

Another embodiment relates to a solvent supply unit for supplying one or more solvents to a high performance chromatography system. This system comprises one or more rocker valves according to one of the previously described embodiments. Each rocker valve can be connected on the input side to one or more solvents and on the output side to an input of a pump for moving a mobile phase in the high performance chromatography system. A control unit is provided to control each rocker valve for the selective supply of the pump with one or more of the solvents connected to the one or more rocker valves.

In one embodiment, the high performance chromatography system furthermore comprises a pump for moving a mobile phase, a stationary phase for separating components of a sample liquid introduced into the mobile phase, and a solvent supply unit for supplying one or more solvents to the pump.

A high performance chromatography system according to an embodiment of the present invention comprises a pump for moving a mobile phase, a stationary phase for separating components of a sample liquid introduced into the mobile phase, and a valve, as noted above, located in a flow path of the mobile phase. The high performance chromatography system may further comprise a sample injector for introducing the sample liquid into the mobile phase, a detector for detecting separated components of the sample liquid and/or a fractionator for dispensing separated components of the sample liquid.

A pure solvent or a mixture of different solvents may be used as the mobile phase (or eluent). The mobile phase can be chosen to minimize retention of components of interest and/or of the amount of mobile phase to drive the chromatography. The mobile phase may also be chosen to effectively separate specific components. It may have an organic solvent, such as, for example, methanol or acetonitrile, which is often diluted with water. For gradient operation, water and an organic solvent (or, alternatively, other solvents commonly used in HPLC) are often varied in their mixing ratio over time.

To extend the applicable temperature range in an alternative embodiment, a conventional valve, such as a known rocker valve, may also be heated, preferably in a linear area. Preferably, the fluid that has flowed through the valve (such as a solvent) is then also correspondingly heated.

BRIEF DESCRIPTION OF THE DRAWINGS

The invention is further explained below with reference to the drawings, wherein like reference numbers refer to like or functionally-like or similar features.

DETAILED DESCRIPTION

Figure 1:
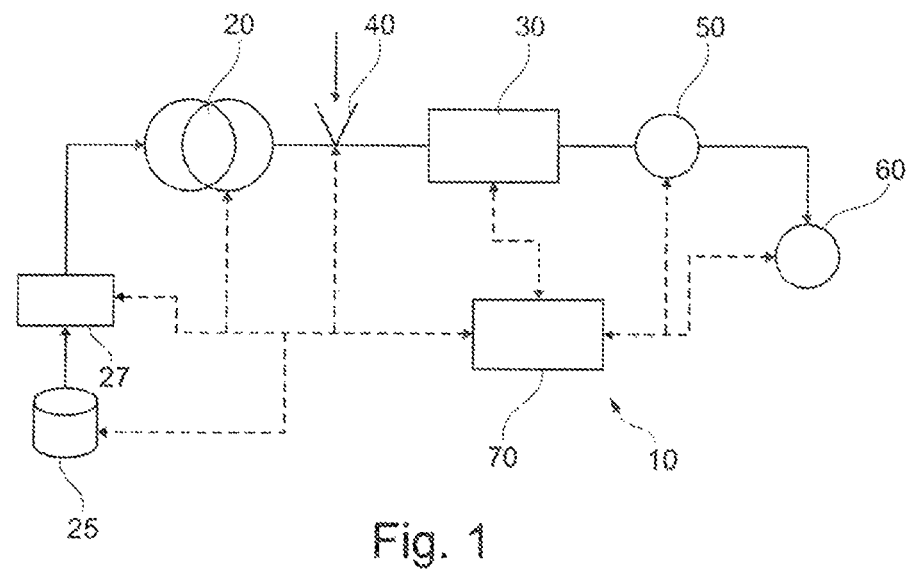
FIG. 1 shows a liquid separation system according to embodiments of the present disclosure, such as, for example, used in HPLC.

In detail, FIG. 1 shows a general illustration of a liquid separation system 10. A pump 20 receives a mobile phase from a solvent supply 25 via a proportioning device 27. A degasser (not shown) may be used to degas the mobile phase and in this manner reduce the amount of dissolved gases in the mobile phase. The pump 20 drives the mobile phase through a separation device 30 (such as a chromatography column) that comprises a stationary phase. A sampling device (or sample injector) 40 may be provided between the pump 20 and the separation device 30 to deliver a sample fluid to the mobile phase. The stationary phase of the separation device 30 is adapted to separate components of the sample fluid. A detector 50 detects separated components of the sample fluid, and a fractionator 60 may be provided for the dispensing of the separated components.

The mobile phase may comprise only one solvent or a mixture of different solvents. Mixing may be performed at low pressure and upstream of the pump 20, such that the pump 20 is already conveying the mixed solvent as the mobile phase. Alternatively, the pump may comprise individual pump units, wherein each pump unit conveys one solvent or solvent mixture at a time, such that the mixing of the mobile phase (as then seen by the separation device 30) occurs at high pressure and downstream of the pump 20. The composition (mixture) of the mobile phase can be maintained constant over time (isocratic mode) or varied over time in a so-called gradient mode.

The proportioning device 27 is used to supply one or more solvents to the pump 20 of the liquid separation system 10. For this purpose, the proportioning device 27 comprises one or more rocker valves, such as, for example, shown in FIG. 2 to FIG. 4. Each rocker valve is connected on the input side to one or more solvents and on the output side to an input of the pump 20.

A data processing unit 70, which may be a conventional personal computer or workstation, may be coupled to one or more of the devices in the liquid separation system 10, as indicated by the dashed arrows, to receive information and/or control the operation of the system or individual components therein. The data processing unit 70 further controls each rocker valve of the proportioning device 27 to selectively supply the pump 20 with one or more solvents.

Figure 2A:
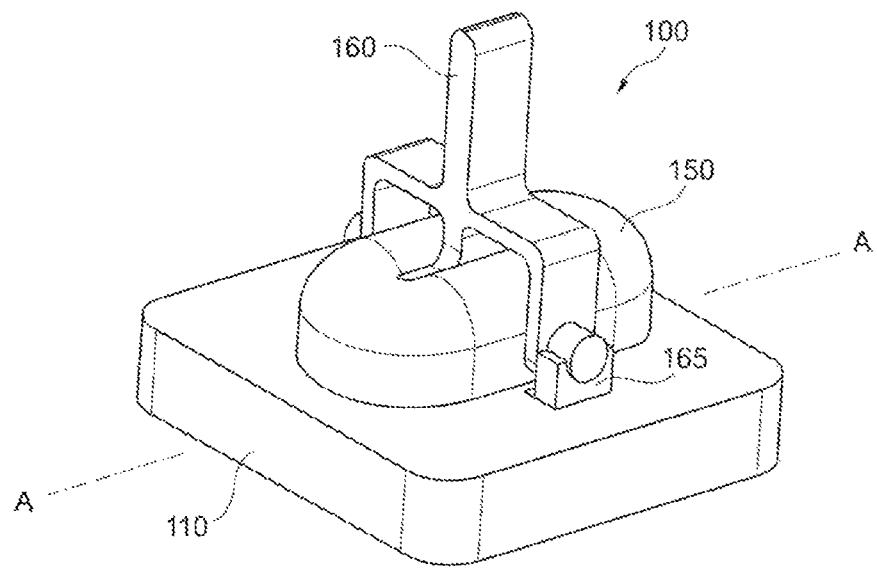
FIG. 2A is a perspective view of a rocker valve according to an embodiment of the present disclosure.
Figure 2B:
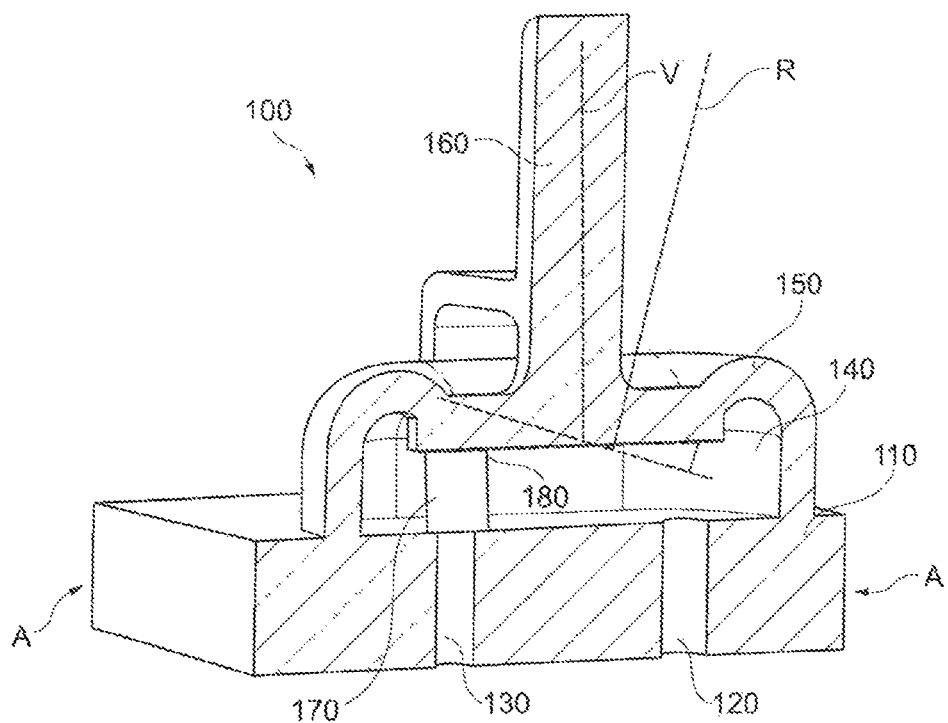
FIG. 2B is a cross-sectional view of the rocker valve illustrated in FIG. 2A, taken along line A-A thereof.

FIG. 2A and FIG. 2B show an embodiment of a rocker valve 100, such as, for example, may be used in the proportioning device 27. Whereas FIG. 2A shows the rocker valve 100 in a three-dimensional illustration from the outside, FIG. 2B likewise shows a three-dimensional illustration of a cross-section through the rocker valve 100 shown in FIG. 2A along the line A-A.

The rocker valve 100 comprises a base plate 110 in which inflows and outflows to the rocker valve 100 may be located. In the embodiment illustrated in FIG. 2, an inlet 120 leads to and an outlet 130 leads away from the rocker valve 100. Inlet 120 and outlet 130 feed into a valve chamber 140, which (in the embodiment shown in FIG. 2) is defined and bounded downwardly by the base plate 110 and upwardly by a membrane 150. The rocker valve 100 furthermore comprises a rocker switch 160 which is rotatably mounted about a bearing 165, such that the rocker switch 160 is pivotal about said bearing 165. For example, the rocker switch 160 can be guided from the (vertical) position V, shown in the FIGS. 2, by pivoting to the right into a pivoting position R, as shown schematically, and by way of example, in FIG. 2B.

The membrane 150 is integrally connected to the rocker switch 160 in the embodiment of FIG. 2. In other embodiments, these rocker switches may be separate and individually formed. The only functionally important aspect is that by actuating the rocker switch 160, the membrane 150 can be actuated with respect to the inlet 120 or the outlet 130.

As illustrated in FIG. 2B, the rocker valve 100 further comprises a sealing element 170 that is arranged on a membrane surface 180 opposite the inlet 120 and the outlet 130 and which sealing element 170 moves along with this membrane surface 180. In the (vertical) position V of the rocker switch 160, the sealing element 170 presses against the outlet 130 to create a fluid-tight seal and thus closes it (in a fluid-tight manner) to the valve chamber 140, whereas the inlet 120 is open to the valve chamber 140. In this position V, the outlet 130 is thus closed off from the valve chamber 140 and the inlet 120 that is fluidically connected thereto, such that a flow between the inlet 120 and the outlet 130 is inhibited or rather the flow path between the inlet 120 and the outlet 130 is interrupted.

By pivoting the rocker switch 160 (to the right in the embodiment of FIG. 2), for example, to the position R, the sealing element 170 is raised relative to the outlet 130 and no longer seals the outlet 130 in a fluid-tight manner, such that a flow path is opened between the inlet 120 and the outlet 130 and whereby a flow between the inlet 120 and the outlet 130 is enabled.

In this manner, the rocker valve 100 closes the flow path between inlet 120 and outlet 130 in the (switching) position V of the rocker switch 160 and opens it in the (switching) position R of the rocker switch 160. Between these positions V and R, the flow path between inlet 120 and outlet 130 is more or less opened or alternatively closed.

By separating the sealing element 170 from the membrane 150 (or alternatively from the membrane surface 180), the various functions of the rocker valve 100 can be adjusted and optimized in a targeted manner. The use of the sealing element 170 thus allows an optimization of the sealing function with respect to the outlet 130, whereas the membrane 150 can, for example, be optimized in a targeted manner for longevity with respect to strain brought about by the mechanical load of the rocker switch 160 during switching.

In one embodiment, the material of the membrane 150 and/or the membrane surface 180 is selected such that the elasticity and/or toughness is substantially independent of temperature within a temperature range intended for operation of the rocker valve 100. Typical temperature ranges may be between −10° C. and 80° C., in particular between 0° C. and 50° C., and more particularly between 4° C. and 40° C.

In another embodiment, the material of the membrane 150 and/or the membrane surface 180 is selected such that the modulus of elasticity, preferably the complex modulus of elasticity, is substantially independent of temperature or changes only insignificantly within the temperature range intended for operation of the rocker valve 100.

The material of the sealing element 170 may be selected such that within the temperature range intended for operation of the rocker valve 100, it has a sealing property that is sufficient for the rocker valve 100 application, such that the sealing element 170 is pressed against the opening or outlet 130 in a fluid-tight sealing manner by pivoting the rocker switch 160 (for example, into the switching position V illustrated in FIG. 2B). The toughness and/or the modulus of elasticity, preferably the complex modulus of elasticity, of the sealing element 170 may thereby exhibit a dependence on temperature within the temperature range intended for operation of the rocker valve, which need not have a negative effect on the sealing functionality.

The material of the membrane 150 and/or the membrane surface 180 may be or comprise, for example, Teflon® material, PEEK (polyetheretherketone), PTFE (polytetrafluoroethylene, for example, Moldflon® material), as well as mixtures or modifications of these materials.

The sealing element 170 may consist of or include, for example, an elastic material, a perfluoroelastomer, perfluorinated rubber, FKM, FFKM, ETP® fluoroelastomer (a polymer of ethylene, tetrafluoroethylene (TFE) and perfluoromethylvinylether (PMVE)), as well as a mixture or a modification of these materials.

It is clear that other materials or combinations of materials can be used, depending on the desired application and in particular on the intended temperature range. When using the previously presented materials, the service life of embodiments of the rocker valve 100 could be significantly extended, for example, when used in an extended temperature range (such as below 7° C.), without limiting the sealing functionality.

In the embodiment illustrated in FIG. 2, the sealing element 170 is used to close or open the outlet 130 to fluid. Accordingly, the sealing element 170 could also act with respect to the inlet 120, either closing or opening it to fluid. Alternatively, several sealing elements 170 can also be used, for example, according to the embodiment example in FIG. 2, a first sealing element 170 between the membrane surface 180 and the outlet 130 and a second sealing element 170 between the membrane surface 180 and the inlet 120.

Figure 3A:
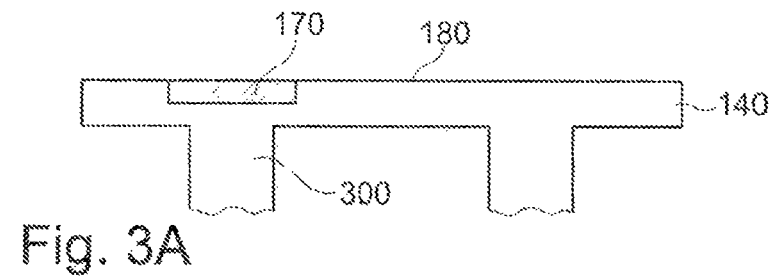
FIG. 3A is a cross-sectional view of a rocker valve according to another embodiment of the present disclosure.
Figure 3B:
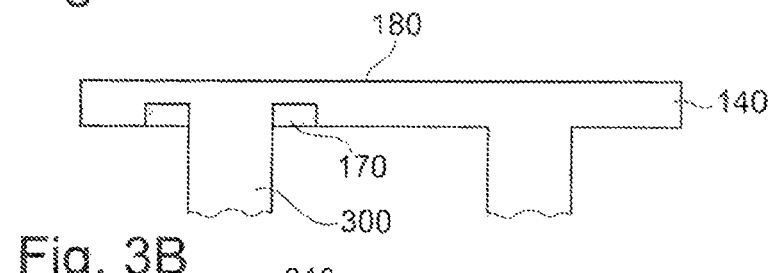
FIG. 3B is a cross-sectional view of a rocker valve according to another embodiment of the present disclosure.
Figure 3C:
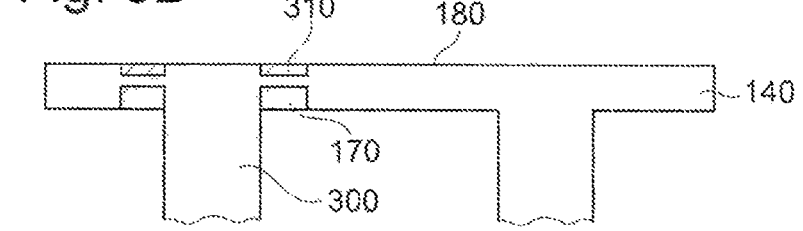
FIG. 3C is a cross-sectional view of a rocker valve according to another embodiment of the present disclosure.

As an alternative to the embodiment of FIG. 2, in which the sealing element 170 is (fixedly) connected to the membrane surface 180 or attached thereto, the sealing element 170 can also be arranged, for example, in a sealing manner around an opening that feeds into the valve chamber 140 and which can be switchably sealed by the rocker valve 100, such as the inlet 120 or the outlet 130. Accordingly, combinations can also be conceivable. This is shown schematically in FIG. 3. In FIG. 3A, the sealing element 170 is fixedly connected to the membrane surface 180 and is attached to the membrane surface opposite an opening 300 to be sealed, which can be, for example, the inlet 120 or the outlet 130. In FIG. 3B, the sealing element 170 is arranged around the opening 300 in a ring shape and projects into the valve chamber 140. The sealing element 170 may, for example, be fixedly connected to the base plate 110. By pressing the membrane surface 180 against the sealing element 170 (not shown in FIG. 3B), the opening 300 can be sealed in a fluid-tight manner. In FIG. 3C, in addition to the sealing element 170 arranged around the opening 300, as shown in FIG. 3B, another sealing element 310 is provided that is fixedly connected to the membrane surface 180 (corresponding to the sealing element 170 shown in FIG. 3A).

Figure 4A:
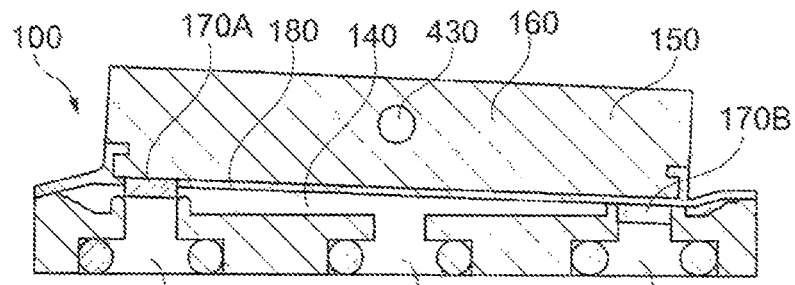
FIG. 4A is a cross-sectional view of a rocker valve according to another embodiment of the present disclosure.
Figure 4B:
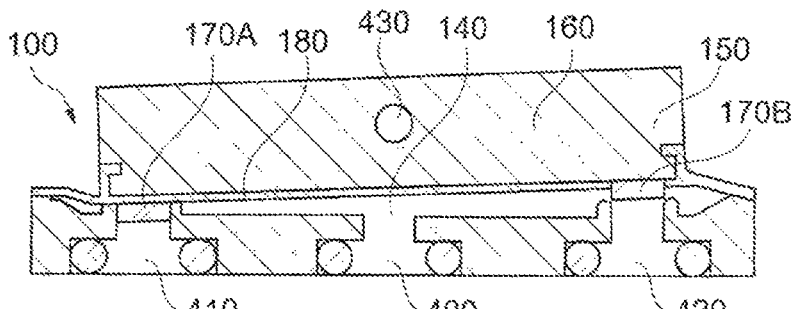
FIG. 4B is a cross-sectional view of the rocker valve illustrated in FIG. 4A, shown in a different position.

FIG. 4 illustrate a further embodiment of a rocker valve 100 with one inlet 400 as well as one first outlet 410 and one second outlet 420. The rocker switch 160 is rotatably or alternatively pivotally mounted about a pivot 430. A first sealing element 170A is fitted to the membrane surface 180 opposite the first outlet 410 and is fixedly connected to the membrane surface 180. Similarly, a second sealing element 170B is fitted to the membrane surface 180 opposite the second outlet 420 and is fixedly connected to the membrane surface 180. FIG. 4A shows a first switching state of the rocker valve 100, in which switching state the second sealing element 170B is in sealing engagement against the second outlet 420, allowing flow communication only between the inlet 400 and the first outlet 410. Accordingly, FIG. 4B shows a second switching state of the rocker valve 100, in which switching state the first sealing element 170A is in sealing engagement against the first outlet 410 so that flow communication is only possible between the inlet 400 and the second outlet 420. In this manner, inflow can be directed from the inlet 400 to either the first outlet 410 when in the switch position of FIG. 4A or to the second outlet 420 when in the switch position of FIG. 4B.

It is clear that the accesses to the valve chamber 140 identified in FIG. 4 may also be assigned otherwise, for example, reference number 400 could represent an outlet into which, by actuation of rocker switch 160, flow can be selectively directed either from a first inlet (reference number 410) when in the switch position of FIG. 4A or from a second inlet (reference number 420) when in the switch position of FIG. 4B. Further permutations are correspondingly conceivable.

It is also apparent that embodiments having openings other than those shown in FIG. 3 and FIG. 4 may be used.

The rocker switch 160 can be actuated either manually, by motor, or, for example, by means of a suitable actuator, as is known in the prior art.

Figure 5:
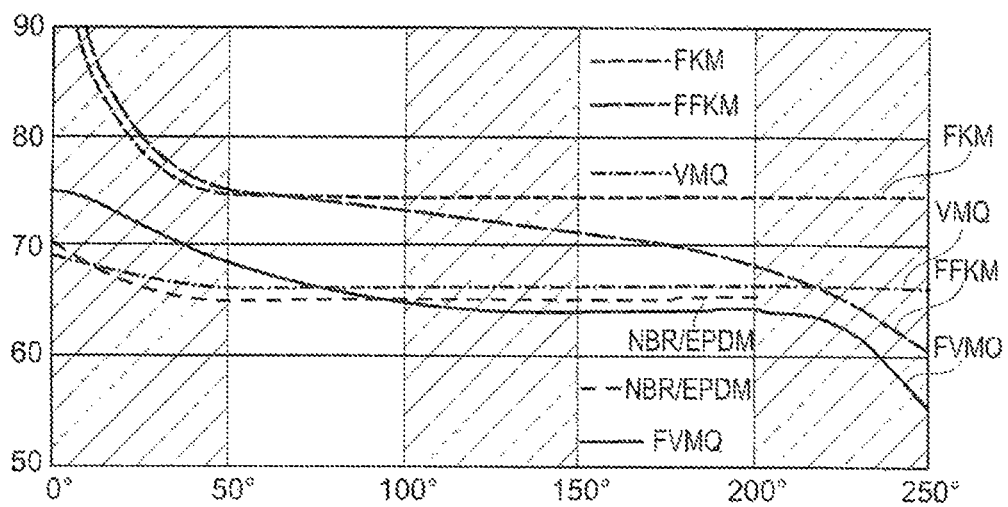
FIG. 5 illustrates a plot of hardness versus temperature for various sealing element materials.

FIG. 5 represents a plot of hardness (complex modulus of elasticity, Shore hardness or Shore A; ordinate versus temperature (abscissa)) versus temperature for different materials for the sealing element. That which may be critical for some applications is typically the lower temperature range, for example, between 0° C. and 20° C. Elastomers are typically quite good for sealing. Due to their elasticity, they are easy to actuate and can, for example, provide compensation for tolerances with respect to the second surface when a given contact pressure is applied to the sealing surface. The sealing effect can thus be enhanced. However, since strong acids and alkalis are also used in HPLC and, in addition, swelling of the material could lead to undesirable side effects such as solvent carryover or destruction of the underlying actuator, fluoroelastomers are particularly suitable for this purpose, with FFKM showing a particularly high chemical suitability. However, FFKM shows a lower suitability with regard to low temperatures (unchanging flexibility of the material).

The invention claimed is:

1. A solvent supply unit for supplying one or more solvents to a high-performance chromatography system, the solvent supply unit comprising:
   one or more rocker valves, each rocker valve comprising an input side configured to be fluidly connected to a solvent supply for supplying the one or more solvents, and an output side configured to be fluidly connected to a pump for moving the one or more solvents as a mobile phase in the high-performance chromatography system, and each rocker valve further comprising:
   at least one sealable opening;
   a valve chamber defining a fluid path through the valve chamber and to or from the at least one sealable opening;
   a pivotally mounted rocker switch located outside the valve chamber and the fluid path, wherein the rocker switch is pivotable between a first position at which the at least one sealable opening is open to the valve chamber and a second position at which the at least one sealable opening is closed to the valve chamber;
   a membrane surface located between the rocker switch and the at least one sealable opening and movable in response to pivoting of the rocker switch; and
   a sealing element,
   wherein, at the second position, the sealing element is located between the membrane surface and the at least one sealable opening and defines a fluid-tight seal preventing fluid flow between the at least one sealable opening and the valve chamber; and
   a control unit configured to control the one or more rocker valves to selectively supply the pump with the one or more solvents.

2. The rocker valve according to claim 1, having a configuration according to at least one of:
   the at least one sealable opening is a valve inlet leading into the valve chamber;
   the at least one sealable opening is a valve outlet leading out from the valve chamber.

3. The rocker valve according to claim 1, comprising a valve inlet leading into the valve chamber and a valve outlet leading out from the valve chamber, wherein:
   the at least one sealable opening corresponds to at least one of the valve inlet and the valve outlet; and
   at the first position, the valve chamber fluidically connects the valve inlet and the valve outlet.

4. The rocker valve according to claim 1, having a configuration according to one of:
   the at least one sealable opening is a valve inlet leading into the valve chamber, and the rocker valve further comprises a valve outlet leading out from the valve chamber;
   the at least one sealable opening is a valve outlet leading out from the valve chamber, and rocker valve further comprises a valve inlet leading into the valve chamber.

5. The rocker valve according to claim 1, wherein:
   the at least one sealable opening comprises a first opening;
   the rocker valve further comprises a second opening;
   at the first position, the first opening is open to the valve chamber and the second opening is closed to the valve chamber; and at the second position, the first opening is closed to the valve chamber and the second opening is open to the valve chamber.

6. The rocker valve according to claim 1, wherein:
the at least one sealable opening comprises a first opening;
the rocker valve further comprises a second opening and a third opening;
at the first position, the first opening is open to the valve chamber, the second opening is open to the valve chamber, and the third opening is closed to the valve chamber; and
at the second position, the first opening is closed to the valve chamber, the second opening is open to the valve chamber, and the third opening is open to the valve chamber.

7. The rocker valve according to claim 1, wherein the rocker switch is rotatably mounted.

8. The rocker valve according to claim 1, wherein at least a portion of the valve chamber is laterally bounded by the membrane surface.

9. The rocker valve according to claim 1, wherein the sealing element is configured such that by pivoting the rocker switch to the second position, the sealing element is pressed onto the at least one sealable opening to form the fluid-tight seal.

10. The rocker valve according to claim 1, comprising at least one of the following features:
the sealing element is connected to the membrane surface and is moved along with the membrane surface by the rocker switch;
the sealing element surrounds the at least one sealable opening and projects into the valve chamber;
the sealing element comprises a first sealing element and a second sealing element, wherein the first sealing element is connected to the membrane surface and is moved along with the membrane surface by the rocker switch, and the second sealing element surrounds the at least one sealable opening and projects into the valve chamber.

11. The rocker valve according to claim 1, wherein the membrane surface and/or the sealing element comprises a chemically resistant material.

12. The rocker valve according to claim 1, wherein the membrane surface comprises a material selected from the group consisting of: PEEK; PTFE; and mixtures or modifications of the aforementioned materials.

13. The rocker valve according to claim 1, wherein the sealing element comprises a material selected from the group consisting of: an elastic material; a perfluoroelastomer; perfluorinated rubber; FKM; FFKM; a polymer of ethylene, tetrafluoroethylene and perfluoromethylvinylether; and mixtures or modifications of the aforementioned materials.

14. The rocker valve according to claim 1, comprising a base plate, wherein the base plate comprises the at least one sealable opening, at least a portion of the valve chamber is bounded by the membrane surface and the base plate.

15. The rocker valve according to claim 6, having a configuration according to one of:
the first opening and the third opening are valve inlets leading into the valve chamber and the second opening is a valve outlet leading out from the valve chamber;
the first opening and the third opening are valve outlets leading out from the valve chamber and the second opening is a valve inlet leading into the valve chamber.

16. A high-performance chromatography system, comprising:
a pump configured to move one or more solvents as a mobile phase;
a separation device configured to separate components of a sample liquid introduced into the mobile phase;
a solvent supply unit configured to supply the one or more solvents to the pump; and
one or more rocker valves, wherein each rocker valve comprises:
at least one sealable opening;
a valve chamber defining a fluid path through the valve chamber and to or from the at least one sealable opening;
a pivotally mounted rocker switch located outside the valve chamber and the fluid path, wherein the rocker switch is pivotable between a first position at which the at least one sealable opening is open to the valve chamber and a second position at which the at least one sealable opening is closed to the valve chamber;
a membrane surface located between the rocker switch and the at least one sealable opening and movable in response to pivoting of the rocker switch; and
a sealing element,
wherein, at the second position, the sealing element is located between the membrane surface and the at least one sealable opening and defines a fluid-tight seal preventing fluid flow between the at least one sealable opening and the valve chamber.

17. The high-performance chromatography system according to claim 16, wherein:
the at least one sealable opening comprises a first opening;
the rocker valve further comprises a second opening;
at the first position, the first opening is open to the valve chamber and the second opening is closed to the valve chamber; and
at the second position, the first opening is closed to the valve chamber and the second opening is open to the valve chamber.

18. The high-performance chromatography system according to claim 16, wherein:
the at least one sealable opening comprises a first opening;
the rocker valve further comprises a second opening and a third opening;
at the first position, the first opening is open to the valve chamber, the second opening is open to the valve chamber, and the third opening is closed to the valve chamber; and
at the second position, the first opening is closed to the valve chamber, the second opening is open to the valve chamber, and the third opening is open to the valve chamber.

19. The high-performance chromatography system according to claim 16, comprising at least one of the following features:
the sealing element is connected to the membrane surface and is moved along with the membrane surface by the rocker switch;
the sealing element surrounds the at least one sealable opening and projects into the valve chamber;
the sealing element comprises a first sealing element and a second sealing element, wherein the first sealing element is connected to the membrane surface and is moved along with the membrane surface by the rocker switch, and the second sealing element surrounds the at least one sealable opening and projects into the valve chamber.

* * * * *